US012346373B2

(12) United States Patent
DiMaria et al.

(10) Patent No.: US 12,346,373 B2
(45) Date of Patent: *Jul. 1, 2025

(54) MULTIPLE STAGE INDEXING OF AUDIO CONTENT

(71) Applicant: Gracenote, Inc., Emeryville, CA (US)

(72) Inventors: Peter C. DiMaria, Berkeley, CA (US); Markus K. Cremer, Orinda, CA (US); Barnabas Mink, San Francisco, CA (US); Tanji Koshio, Emeryville, CA (US); Kei Tsuji, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,628

(22) Filed: Feb. 26, 2024

(65) Prior Publication Data

US 2024/0202238 A1 Jun. 20, 2024

Related U.S. Application Data

(63) Continuation of application No. 18/050,326, filed on Oct. 27, 2022, now Pat. No. 11,954,149, which is a
(Continued)

(51) Int. Cl.
*G06F 16/683* (2019.01)
*G06F 16/61* (2019.01)

(52) U.S. Cl.
CPC .......... *G06F 16/683* (2019.01); *G06F 16/61* (2019.01)

(58) Field of Classification Search
CPC ....... G06F 16/433; G06F 16/60; G06F 16/683
(Continued)

(56) References Cited

U.S. PATENT DOCUMENTS 9,158,842 B1 * 10/2015 Yagnik .................. G06F 16/683
2006/0229878 A1 * 10/2006 Scheirer ................. G10L 25/48
704/E11.002
(Continued)

OTHER PUBLICATIONS

United States Patent and Trademark Office, "Non-Final Office Action," issued in connection with U.S. Patent Application No. 15/475,459, mailed on Jul. 10, 2019, 10 pages.
(Continued)

*Primary Examiner* — Hung T Vy
(74) *Attorney, Agent, or Firm* — McDonnell Boehnen Hulbert & Berghoff LLP

(57) ABSTRACT

Techniques of content unification are disclosed. In some example embodiments, a computer-implemented method comprises: determining clusters based a comparison of a plurality of audio content using a first matching criteria, each cluster of the plurality of clusters comprising at least two audio content from the plurality of audio content; for each cluster of the plurality of clusters, determining a representative audio content for the cluster from the at least two audio content of the cluster; loading the corresponding representative audio content of each cluster into an index; matching the query audio content to one of the representative audio contents using a first matching criteria; determining the corresponding cluster of the matched representative audio content; and identifying a match between the query audio content and at least one of the audio content of the cluster of the matched representative audio content based on a comparison using a second matching criteria.

20 Claims, 17 Drawing Sheets

Related U.S. Application Data continuation of application No. 17/140,992, filed on Jan. 4, 2021, now Pat. No. 11,487,814, which is a continuation of application No. 15/475,459, filed on Mar. 31, 2017, now Pat. No. 10,885,109.

(58) Field of Classification Search
USPC .................................. 707/769, 803; 381/56
See application file for complete search history.

(56) References Cited

U.S. PATENT DOCUMENTS

| | | | | |
|---|---|---|---|---|
| 2006/0277047 | A1* | 12/2006 | DeBusk | G10L 19/018 |
| | | | | 704/E11.002 |
| 2007/0043768 | A1* | 2/2007 | Kang | G06F 16/683 |
| 2012/0269354 | A1* | 10/2012 | Doherty | G10L 19/005 |
| | | | | 381/56 |
| 2014/0007152 | A1* | 1/2014 | Pora | H04N 21/4394 |
| | | | | 725/18 |
| 2014/0280303 | A1* | 9/2014 | Jain | G06F 16/40 |
| | | | | 707/769 |
| 2014/0280304 | A1* | 9/2014 | Scherf | G06F 16/683 |
| | | | | 707/769 |

OTHER PUBLICATIONS

United States Patent and Trademark Office, "Final Office Action," issued in connection with U.S. Patent Application No. 15/4 75,459, mailed on Dec. 23, 2019, 18 pages.

United States Patent and Trademark Office, "Advisory Action," issued in connection with U.S. Patent Application No. 15/4 75,459, mailed on Mar. 13, 2020, 6 pages.

United States Patent and Trademark Office, "Non-Final Office Action," issued in connection with U.S. Patent Application No. 15/4 75,459, mailed on Apr. 16, 2020, 11 pages.

United States Patent and Trademark Office, "Notice of Allowance and Fee(s) Due," issued in connection with U.S. Appl. No. 15/475,459, mailed on Sep. 3, 2020, 22 pages.

* cited by examiner

| MATCH RESULTS | INTERPRETATION | ADDITIONAL PROCESSING |
| --- | --- | --- |
| AVG BER < 10%, STD BER < 10%, LENGTH +/-10S | CLOSELY RELATED | MICRO/FULL COMPARISON, TEXT SEARCH FOR 'REMASTERED', 'EXPLICIT' |
| AVG BER < 15%, STD BER < 10%, SLIPPAGE > +/-1% | FASTER OR SLOWER VERSION OF SAME SONG | |
| AVG BER < 5%, STD BER < 5%, LENGTH +/-1S | SAME SONG | MICRO/FULL COMPARISON, TEXT SEARCH FOR 'REMASTERED', 'EXPLICIT' |
| AVG BER > 10% < 25%, STD BER < 25%, LENGTH +/-10S | NOTICEABLE DISTORTION SUCH AS CODEC ARTIFACTS OR WATERMARKS | IDENTIFY TRUSTED SOURCE |
| NO MATCH LENGTH > 5S | ALTERNATE VERSION WITH DIFFERENT INSTRUMENT/VOCAL | TEXT SEARCH |

FIG. 11

MULTIPLE STAGE INDEXING OF AUDIO CONTENT

CROSS REFERENCE TO RELATED APPLICATIONS

This application is a continuation of U.S. patent application Ser. No. 18/050,326, filed Oct. 27, 2022, which is a continuation of U.S. patent application Ser. No. 17/140,992, filed Jan. 4, 2021, which is a continuation of U.S. patent application Ser. No. 15/475,459, filed Mar. 31, 2017, now U.S. Pat. No. 10,885,109, the disclosure of each of which is incorporated herein by reference in its entirety.

TECHNICAL FIELD

The present application relates generally to the processing of data, and, in various embodiments, to methods and systems of content unification.

BACKGROUND

Audio information (e.g., sounds, speech, music, or any suitable combination thereof) may be represented as digital data (e.g., electronic, optical, or any suitable combination thereof). For example, a piece of music, such as a song, may be represented by audio data, and such audio data may be stored, temporarily or permanently, as all or part of a file (e.g., a single-track audio file or a multi-track audio file). In addition, such audio data may be communicated as all or part of a stream of data (e.g., a single-track audio stream or a multi-track audio stream).

BRIEF DESCRIPTION OF THE DRAWINGS

Some embodiments of the present disclosure are illustrated by way of example and not limitation in the figures of the accompanying drawings, in which like reference numbers indicate similar elements.

FIG. 11 illustrates a table of interpretation rules, in accordance with some example embodiments.

DETAILED DESCRIPTION

Figure 1:
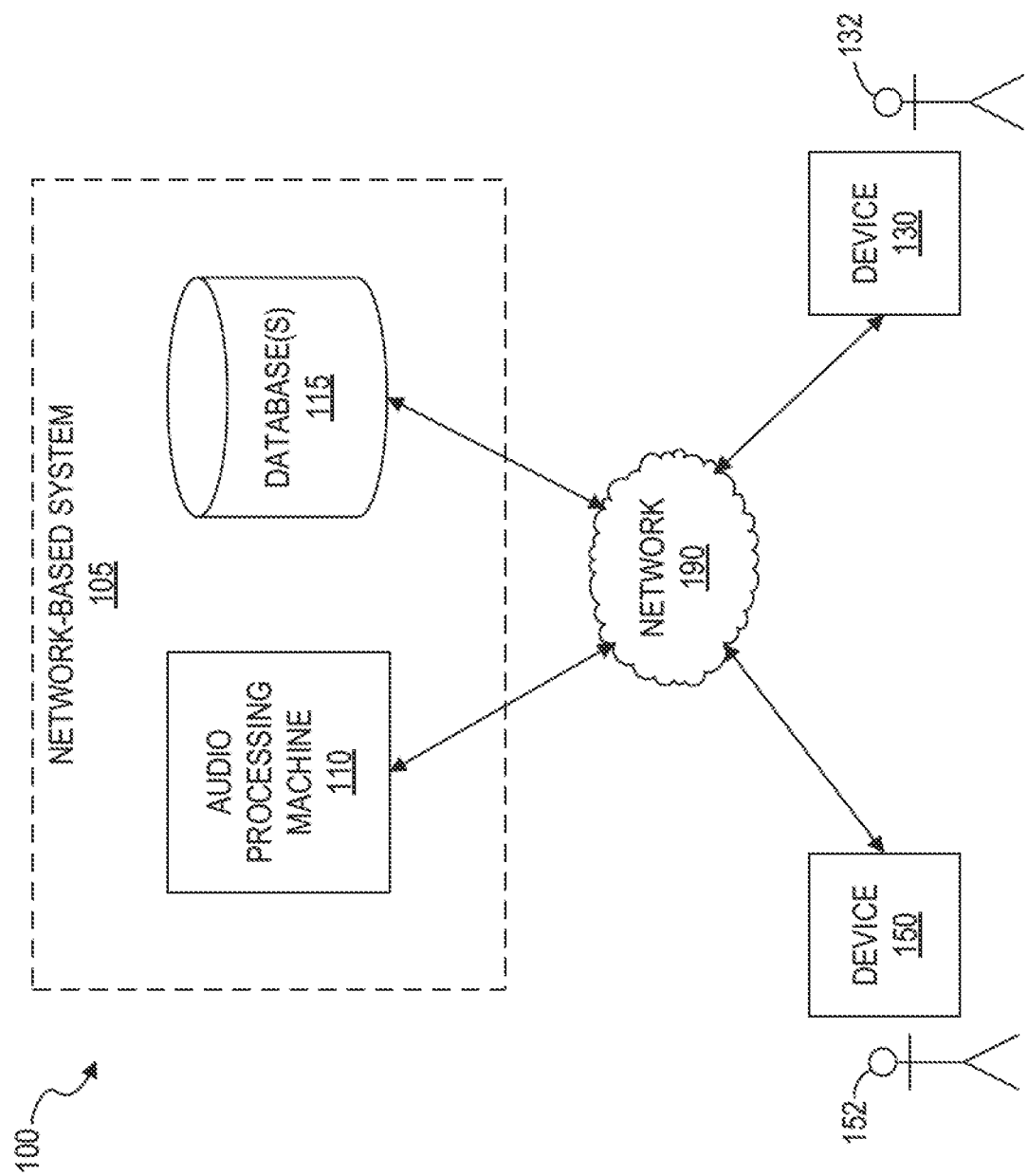
FIG. 1 is a block diagram illustrating a network environment suitable for content unification, in accordance with some example embodiments.

Example methods and systems of content unification are disclosed. Examples merely typify possible variations. Unless explicitly stated otherwise, components and functions are optional and may be combined or subdivided, and operations may vary in sequence or be combined or subdivided. In the following description, for purposes of explanation, numerous specific details are set forth in order to provide a thorough understanding of example embodiments. It will be evident, however, to one skilled in the art that the present embodiments can be practiced without these specific details.

In some example embodiments, a computer-implemented system comprising at least one processor performs operations comprising: determining, by at least one hardware processor, a plurality of clusters based a comparison of a plurality of audio content using a first matching criteria, each cluster of the plurality of clusters comprising at least two audio content from the plurality of audio content; for each cluster of the plurality of clusters, determining, by the at least one hardware processor, a representative audio content for the cluster from the at least two audio content of the cluster; loading, by the at least one hardware processor, the corresponding representative audio content of each cluster in the plurality of clusters into an index; comparing, by the at least one hardware processor, a query audio content to each one of the representative audio contents in the index using a first matching criteria; matching, by the at least one hardware processor, the query audio content to one of the representative audio contents based on the comparing of the query audio content to each one of the representative audio contents in the index; determining, by the at least one hardware processor, the corresponding cluster of the matched one of the representative audio contents; comparing, by the at least one hardware processor, the query audio content to each one of the at least two audio content of the determined corresponding cluster of the matched one of the representative audio contents using a second matching criteria different from the first matching criteria; and identifying, by the at least one hardware processor, a match between the query audio content and at least one of the audio content of the determined corresponding cluster of the matched one of the representative audio contents based on the comparing of the query audio content to each one of the at least two audio content of the determined corresponding cluster.

In some example embodiments, the determining the plurality of clusters comprises comparing fingerprint data of each of the plurality of audio content using the first matching criteria. In some example embodiments, the fingerprint data comprises a nano-fingerprint.

In some example embodiments, the corresponding representative audio content of each cluster in the plurality of clusters is the only audio content of the cluster that is loaded into the index.

In some example embodiments, the matching of the query audio content to one of the representative audio contents comprises comparing fingerprint data of the query audio content with fingerprint data of each of the representative audio contents in the index using the first matching criteria. In some example embodiments, the fingerprint data comprises a nano-fingerprint.

In some example embodiments, the comparing the query audio content to each one of the at least two audio content of the determined corresponding cluster comprises comparing fingerprint data of the query audio content with fingerprint data of each one of the at least two audio content of the determined corresponding cluster using the second matching criteria. In some example embodiments, the fingerprint data comprises a micro-fingerprint. In some example embodiments, the fingerprint data comprises a full fingerprint.

In some example embodiments, each one of the plurality of audio content comprises a song.

In some example embodiments, a computer-implemented system performs operations comprising: for each audio file in a first plurality of audio files, selecting, by at least one hardware processor, a first plurality of fingerprint blocks of the audio file, each one of the first plurality of fingerprint blocks of the audio file comprising a first plurality of fingerprints of the audio file; for each one of the first plurality of fingerprint blocks, generating a first plurality of hash values, each one of the first plurality of hash values being generated using a different random selection of a first plurality of bits of the selected fingerprint block; and building an index using the generated first plurality of hash values, the building of the index comprising, for each one of the generated first plurality of hash values, storing an identifier of the audio file of the selected one of the first plurality of fingerprint blocks for which the hash value was generated, the identifier being stored in association with the hash value in a database.

In some example embodiments, the operations further comprise: for one of the audio files in the plurality of audio files, selecting a second plurality of fingerprint blocks of the one audio file, each one of the second plurality of fingerprint blocks of the one audio file comprising a second plurality of fingerprints of the one audio file; for each one of the second plurality of fingerprint blocks, generating a second plurality of hash values, each one of the second plurality of hash values being generated using a different random selection of a second plurality of bits of the selected fingerprint block from the second plurality of fingerprint blocks; for each one of the second plurality of hash values, identifying the corresponding identifiers stored in the index in association with the one of the second plurality of hash values, the identified identifiers forming a list of candidate identifiers; determining that at least one of the identified identifiers in the list of candidate identifiers was identified less than a threshold number of times during the identifying of the corresponding identifiers; and removing the at least one of the identified identifiers from the list of candidate identifiers.

In some example embodiments, the operations further comprise: comparing fingerprints of the audio files corresponding to the identifiers in the list of candidate identifiers with one another; interpreting results of the comparing of the fingerprints based on at least one interpretation rule; and identifying relationships between the audio files corresponding to the identifiers in the list of candidate identifiers based on the interpreting of the results.

In some example embodiments, the operations further comprise storing indications of the identified relationships in the database in association with the corresponding audio files.

In some example embodiments, the identifying the relationships comprises identifying two of the audio files corresponding to the identifiers in the list of candidate identifiers to be duplicates, and the operations further comprise removing one of the two audio files from the database based on the identifying of the two audio files to be duplicates.

In some example embodiments, the at least one interpretation rule comprises a plurality of interpretation rules, each one of the plurality of interpretation rules comprising a different set of statistical criteria.

In some example embodiments, the statistical criteria comprises one or more of a criteria for bit error rate and a criteria for slippage of match position over time.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

FIG. 1 is a block diagram illustrating a network environment suitable for content unification, in accordance with some example embodiments. The network environment 100 includes an audio processing machine 110, one or more databases 115, and one or more devices, such as devices 130 and 150, all communicatively coupled to each other via a network 190. The audio processing machine 110, the database(s) 115, and the devices 130 and 150 may each be implemented in a computer system, in whole or in part, as described below with respect to FIG. 16.

In some example embodiments, the database(s) 115 store one or more pieces of audio data (e.g., for access by the audio processing machine 110). The database(s) 115 may store one or more pieces of reference audio data (e.g., audio files, such as songs, that have been previously identified), candidate audio data (e.g., audio files of songs having unknown identity, for example, submitted by users as candidates for identification), or any suitable combination thereof.

In some example embodiments, the audio processing machine 110 is configured to access audio data from the database(s) 115, from the device 130, from the device 150, or any suitable combination thereof. One or both of the devices 130 and 150 may store one or more pieces of audio data (e.g., reference audio data, candidate audio data, or both). The audio processing machine 110, with or without the database(s) 115, may form all or part of a network-based system 105. For example, the network-based system 105 may be or include a cloud-based audio processing system (e.g., a cloud-based audio identification system).

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the audio processing machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
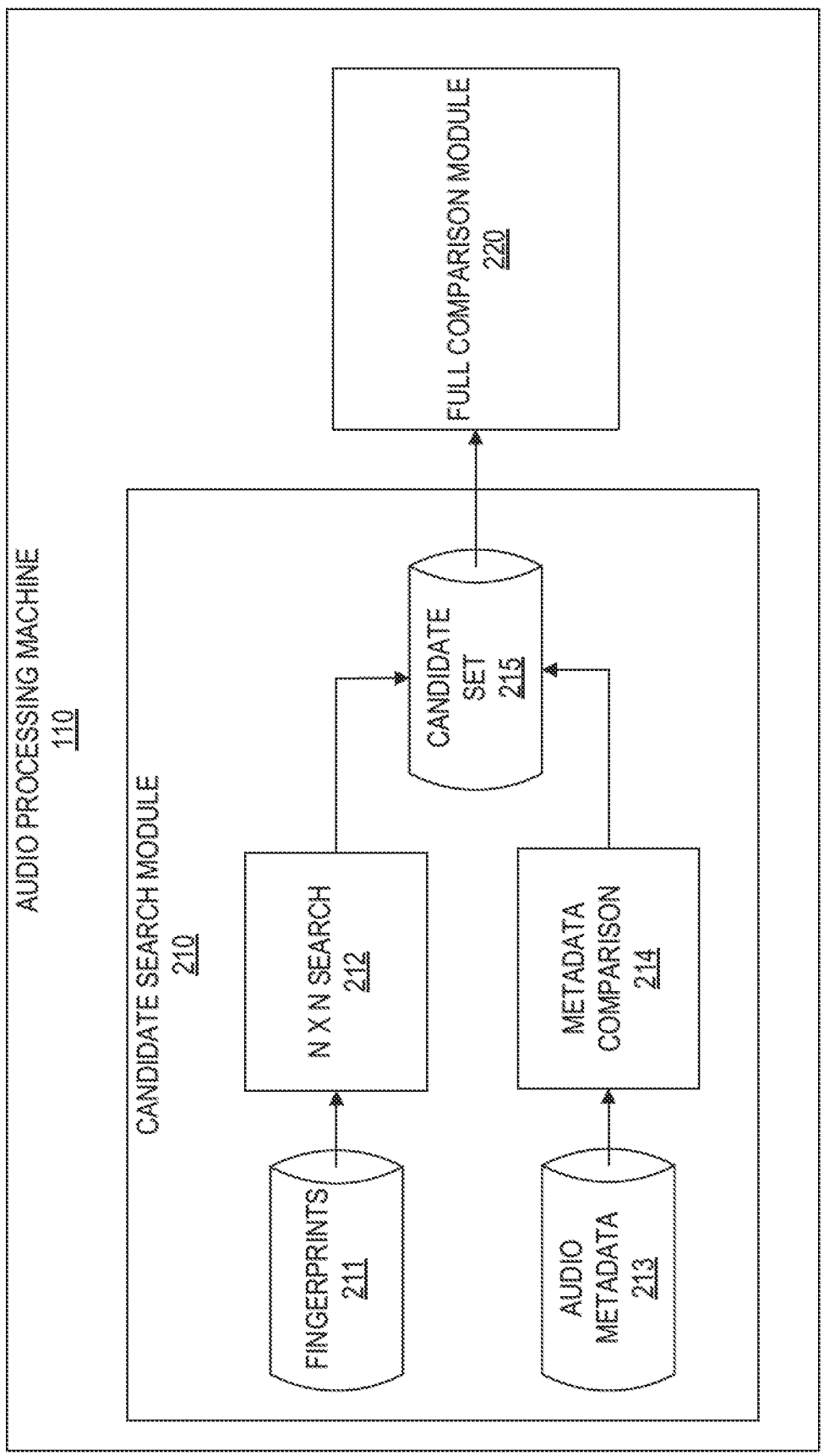
FIG. 2 is a block diagram illustrating components of an audio processing machine, in accordance with some example embodiments.

FIG. 2 is a block diagram illustrating components of the audio processing machine 110, in accordance with some example embodiments. In some example embodiments, the audio processing machine 110 is configured to function as a cloud-based music fingerprinting server machine (e.g., configured to provide a cloud-based music fingerprinting service to the users 132 and 152), a cloud-based music identification server machine (e.g., configured to provide a cloud-based music identification service to the users 132 and 152), or both.

The audio processing machine 110, or other components of the network-based system 105, can use the identification of songs (or other types of audio files) for a variety of purposes, including, but not limited to, selecting songs to present to users, selecting songs to recommend to users, merging and linking songs in a database, and managing and analyzing statistics regarding the usage and popularity of songs.

In some example embodiments, the audio processing machine 110 is configured to identify identical audio files, as well as substantial similarities between audio files in cases where the audio files are not completely identical. For example, identical (or nearly identical) recordings of same song may be present on two different albums (e.g., identical recordings of a song being on both an original album and a "best of" or "greatest hits" album). In another example, different recordings of the same song may be similar, but not identical (e.g., a studio version of a song versus a live acoustic version of the song, an original unedited version of a song versus a radio edited version of the song).

Duplicate recordings of the same song can cause problems. For example, the actual popularity of a song may be diluted as a result of usage or other engagement data being spread amongst multiple identical recordings of the same song. Additionally, duplicate recordings result in inefficient database management, using up limited storage capacity unnecessarily. The features of the present disclosure provide technical solutions to these and other technical problems.

In some example embodiments, the audio processing machine 110 comprises a candidate search module 210 and a full comparison module 220. The candidate search module 210 is configured to select, or otherwise determine, a set of candidate audio files from a larger set of audio files to be provided to the full comparison module 220. The full comparison module 220 is configured to determine the relationship between the set of candidate audio files. The candidate search module 210 reduces the number of audio files to be analyzed and compared, thereby reducing the workload of the full comparison module 220 and, consequently, the audio processing machine 110.

In some example embodiments, the candidate search module 210 is configured to input a plurality of fingerprints 211 of audio files (e.g., songs) into a search module 212 that is configured to compare each audio file with every other audio file, thereby performing an N×N search and comparison of the audio files based on their corresponding fingerprints 211, identifying audio files that have been determined to satisfy a similarity threshold with respect to one another or otherwise determined to be sufficiently similar to one another based on an analysis of their fingerprints 211.

In some example embodiments, the candidate search module 210 is also configured to input metadata 213 of the audio files into a metadata comparison module 214. The metadata 213 may include, but is not limited to, artist name or track name (e.g., song title) or both. The metadata comparison module 214 compares the metadata 213 of the audio files, performing a loose text matching of the metadata 213 between the audio files. For example, the metadata comparison module 214 may compare the artist name and track name of an audio file with the artist names and track names of the other audio files. The metadata comparison module 214 may determine which audio files have sufficiently similar metadata, such as by using a similarity threshold (e.g., a minimum number of matching characters).

The results of the search and comparison by the search module 212 and the text comparison by the metadata comparison module 214 are combined, or otherwise used, to form a set of candidate audio files 215. This set of candidate audio file 215 is significantly smaller in size than the original set of audio files for which the fingerprints 211 were inputted into the search module 212.

In some example embodiments, the fingerprints 211 are retrieved by the candidate search module 210 from the database(s) 115 or from one or more external sources or from a combination of both. In some example embodiments, the audio processing machine 110 generates fingerprints, such as fingerprints 211. It is contemplated that the fingerprints may be generated in a variety of ways and in a variety of forms.

Figure 3:
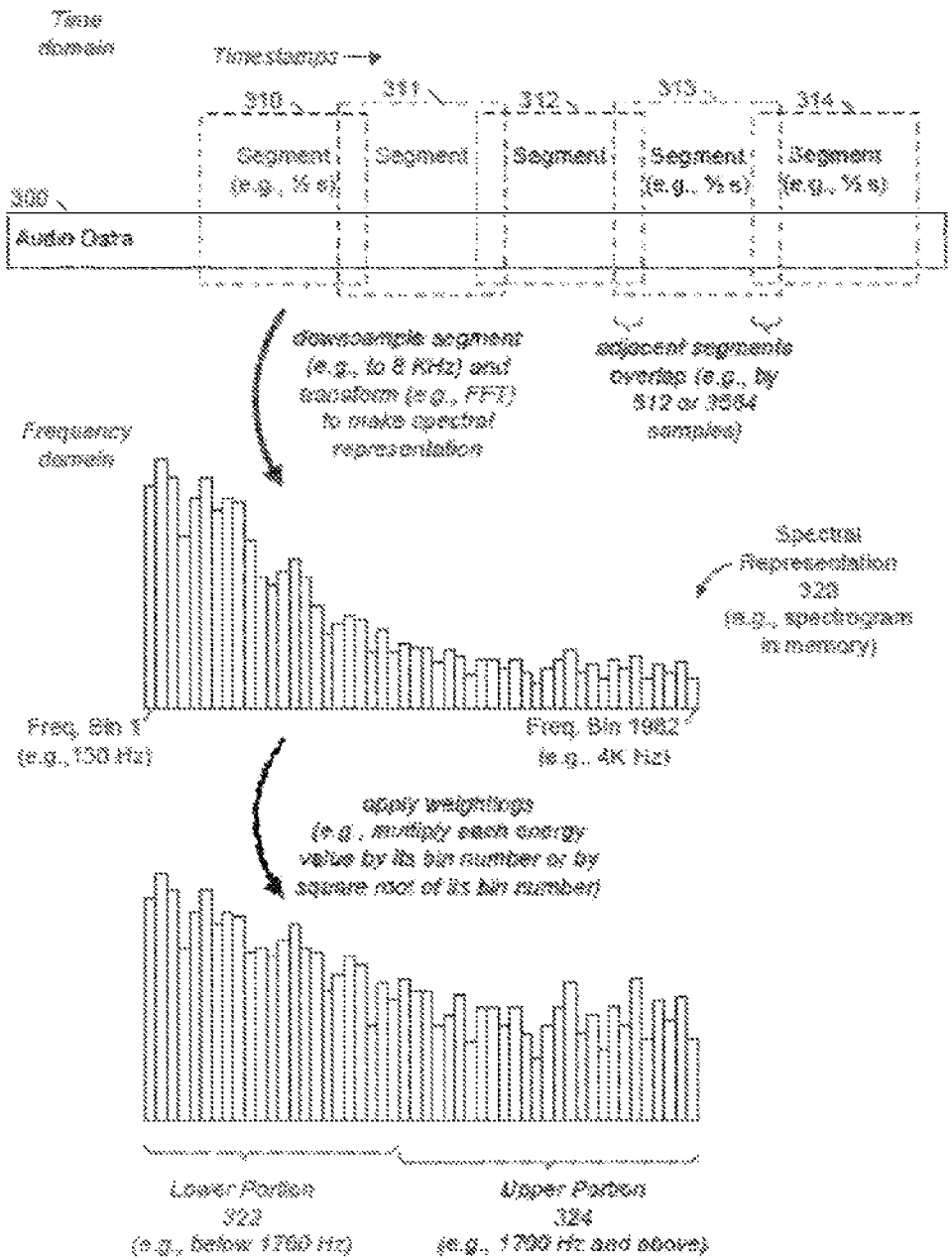
FIGS. 3-6 are a conceptual diagram illustrating operations in audio fingerprinting, in accordance with some example embodiments.

FIGS. 3-6 are a conceptual diagram illustrating operations in audio fingerprinting, in accordance with some example embodiments. At the top of FIG. 3, audio data 300 is shown in the time domain. Examples of the audio data 300 include an audio file (e.g., containing a single-channel or multi-channel recording of a song), an audio stream (e.g., including one or more channels or tracks of audio information), or any portion thereof. Segments 310, 311, 312, 313, and 314 of the audio data 300 are shown as overlapping segments 310-314. For example, the segments 310-314 may be half-second portions (e.g., 500 milliseconds in duration) of the audio data 300, and the segments 310-314 may overlap such that adjacent segments (e.g., segments 313 and 314) overlap each other by a sixteenth of a second (e.g., 512 audio samples, sampled at 8 KHz). In some example embodiments, a different amount of overlap is used (e.g., 448 milliseconds or 3584 samples, sampled at 8 KHz). As shown in FIG. 3, the segments 310-314 may each have a timestamp (e.g., a timecode relative to the audio data 300), and these timestamps may increase (e.g., monotonically) throughout the duration of the audio data 300.

As shown by a curved arrow in the upper portion of FIG. 3, any segment (e.g., segment 310) of the audio data 300 may be downsampled and transformed to obtain a spectral representation (e.g., spectral representation 320) of that segment. For example, FIG. 3 depicts the segments 310 being downsampled (e.g., to 8 KHz) and mathematically transformed (e.g., by a Fast Fourier Transform (FFT)) to make the spectral representation 320 (e.g., a spectrogram of the segment 310, stored temporarily or permanently in a memory). The spectral representation 320 indicates energy values for a set of frequencies. FIG. 3 depicts the spectral representation 320 as indicating an energy value for each of 1,982 frequencies, which are denoted as "frequency bins" in FIG. 3. For example, Frequency Bin 1 may correspond to 130 Hz, and its energy value with respect to the segment 310 may be indicated within the spectral representation 320. As another example, Frequency Bin 1982 may correspond to 4000 Hz, and its energy value with respect to the segment 310 may also be indicated within the spectral representation 320.

As shown by curved arrow in the lower portion of FIG. 3, the spectral representation 320 may be processed (e.g., by the audio processing machine 110) by applying weightings to one or more of its frequencies (e.g., to one or more of its frequency bins). A separate weighting factor may be applied for each frequency, for example, based on the position of each frequency within the spectral representation 320. The position of a frequency in the spectral representation 320 may be expressed as its frequency bin number (e.g., Frequency Bin 1 for the first and lowest frequency represented, Frequency Bin 2 for the second, next-lowest frequency represented, and Frequency Bin 1982 for the $1982^{nd}$ and highest frequency represented). For example, the audio processing machine 110 may multiply each energy value by its frequency bin number (e.g., 1 for Frequency Bin 1, or 1982 for Frequency Bin 1982). As another example, each energy value may be multiplied by the square root of its frequency bin number (e.g., 1 for Frequency Bin 1, or sqrt(1982) for Frequency Bin 1982). FIG. 3 further depicts the spectral representation 320 (e.g., after such weightings are applied) being subdivided into multiple portions. As shown, a lower portion 322 of the spectral representation 320 includes frequencies (e.g., frequency bins) that are below a predetermined threshold frequency (e.g., 1700 Hz), and an upper portion 324 of the spectral representation 320 includes frequencies (e.g., frequency bins) that are at least the predetermined threshold frequency (e.g., 1700 Hz). Although FIGS. 3 and 4 show only two portions of the spectral representation 320, various example embodiments may divide the spectral representation 320 into more than two portions (e.g., lower, middle, and upper portions).

Figure 4:
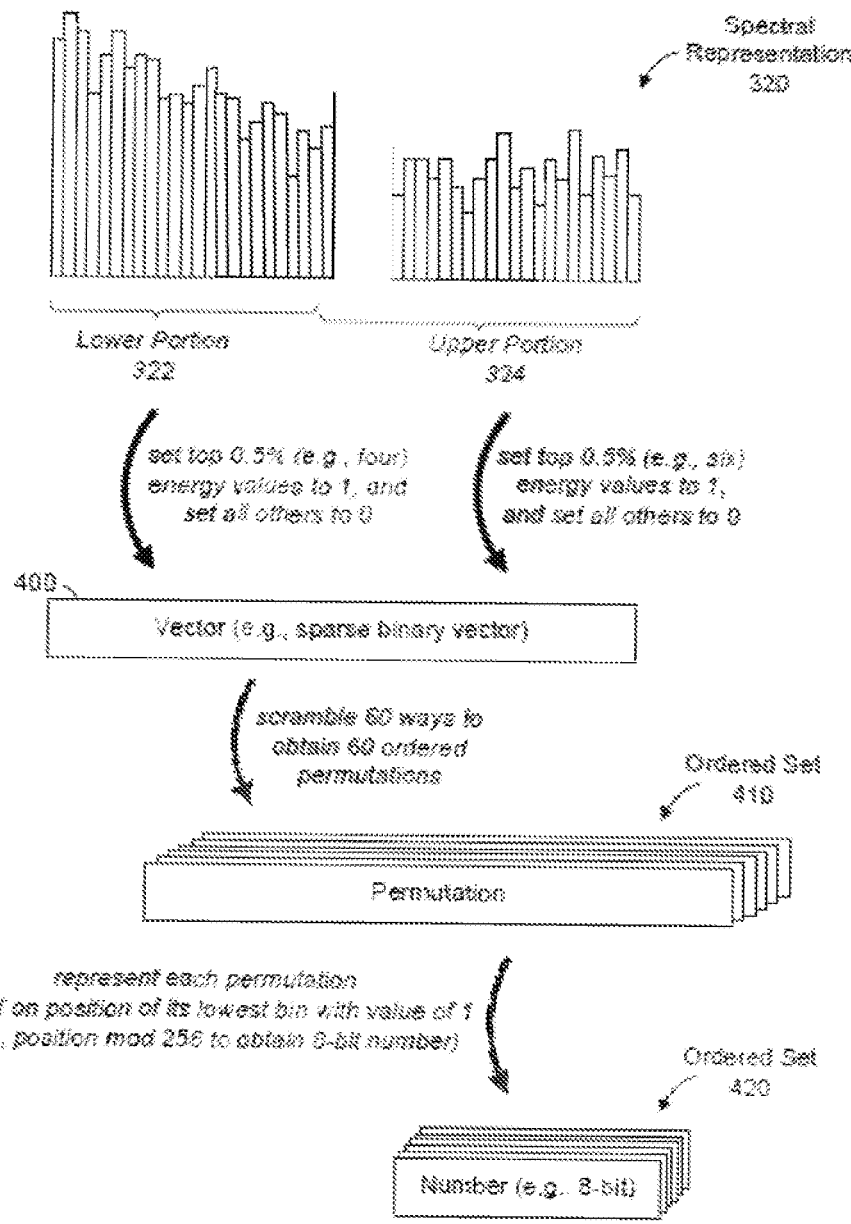

As shown in FIG. 4, the spectral representation 320 may be used (e.g., by the audio processing machine 110) as a basis for generating a vector 400. For example, the audio processing machine 110 may set a representative group of highest energy values in the lower portion 322 of the spectral representation 320 to a single common non-zero value (e.g., 1) and set all other energy values to zero. FIG. 4 depicts setting the top 0.5% energy values (e.g., the top four energy values) from the lower portion 322 to a value of one, while setting all other values from the lower portion 322 to a value of zero. As another example, the audio processing machine 110 may set a representative group of highest energy values in the upper portion 324 of the spectral representation 320 to a single common non-zero value (e.g., 1), though this value need not be the same value as used for the lower portion 322 of the spectral representation 320, and set all other energy values to zero. FIG. 4 depicts setting the top 0.5% energy values (e.g., the top six energy values) from the upper portion 324 to a value of one, while setting all other values from the upper portion 324 to a value of zero. Accordingly, the resulting vector 400 may be a sparse vector, a binary vector, or both (e.g., a sparse binary vector). Although the example embodiments depicted in FIG. 4 utilize the top 0.5% energy values from the lower portion 322 and the upper portion 324, various example embodiments may utilize a different percentage, and may utilize differing percentages for the lower portion 322 than the upper portion 324.

FIG. 4 additionally shows that, once the vector 400 is obtained (e.g., generated), it may be permutated (e.g., scrambled or rearranged) to obtain an ordered set 410 of one or more permutations of the vector 400. For example, the audio processing machine 110 may scramble the vector 400 a predetermined number of times in a predetermined number of ways (e.g., manners) and in a predetermined sequential order. FIG. 4 depicts the vector 400 being scrambled 60 different ways to obtain 60 different permutations, which may be ordered permutations (e.g., maintained in the same sequential order as used to scramble the vector 400). In some example embodiments, the predetermined ways to permutate the vector 400 are mutually unique and contain no duplicate ways to permutate the vector 400. In alternative example embodiments, the predetermined ways to permutate the vector 400 are not mutually unique and include at least one repeated or duplicated way to permutate the vector 400.

As shown in FIG. 4, after the ordered set 410 of permutations has been obtained (e.g., generated), the audio processing machine 110 may generate (e.g., calculate) an ordered set 420 of numbers, each of which respectively represents one of the permutations in the ordered set 410 of permutations. For example, a permutation may be represented by a number that is generated based on the position of its lowest frequency (e.g., lowest bin number) that has a non-zero value (e.g., energy value). For example, if the permutation has a value of zero for Frequency Bin 1 and a value of one for Frequency Bin 2, the number that represents this permutation may be generated based on "2." As another example, if the permutation has values of zero for Frequency Bins 1-9 and a value of one for Frequency Bin 10, the number that represents this permutation may be generated based on "10." As a further example, if the permutation has values of zero for Frequency Bins 1-9 and 11-14 and values of one for Frequency Bins 10 and 15, the number that represents this permutation may be generated based on "10." Moreover, as shown in FIG. 4, the number that represents a permutation may be generated as an 8-bit number (e.g., by performing a modulo 256 operation on the position of the lowest frequency that has a non-zero value). By generating such a number for each of the permutations in the ordered set 410 of permutations, the audio processing machine 110 may generate the ordered set 420 of numbers.

Figure 5:
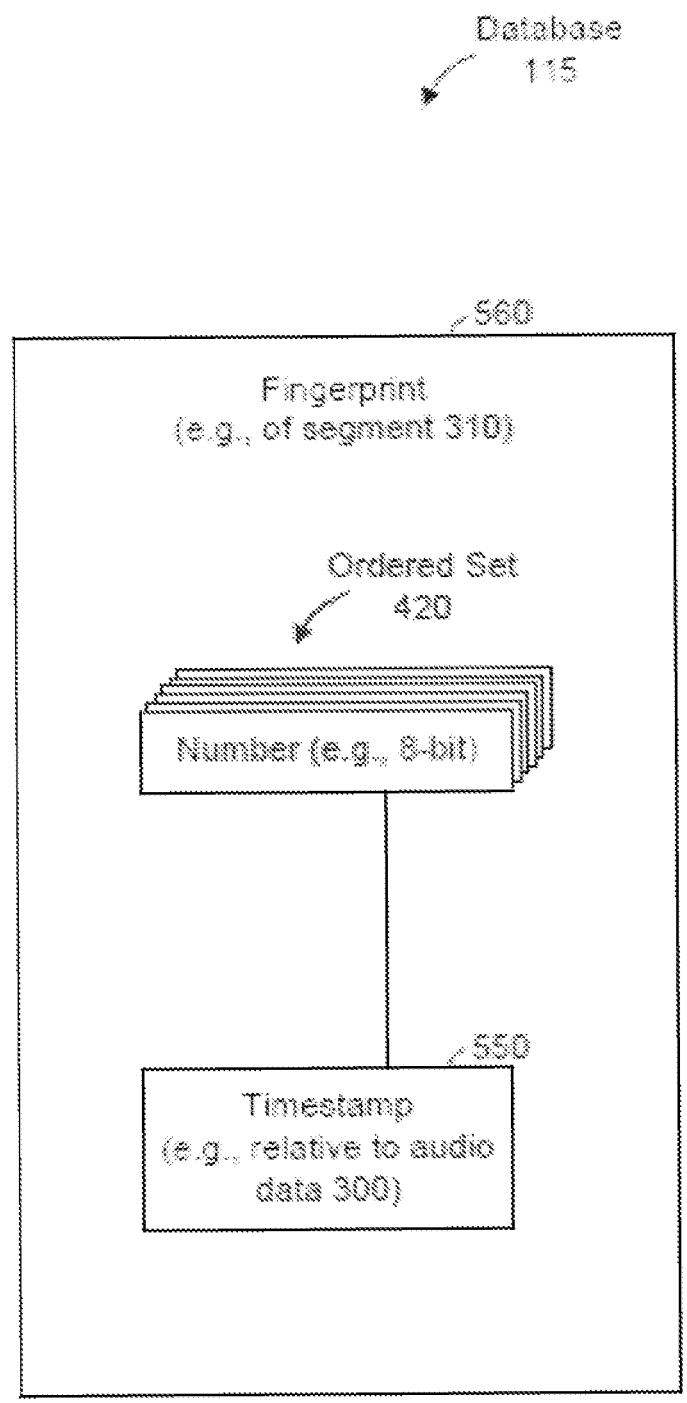

As shown in FIG. 5, the ordered set 420 of numbers (e.g., 8-bit numbers) may be stored in the database(s) 115 as a fingerprint 560 of the segment 310 of the audio data 300. The fingerprint 560 of the segment 310 may be conceptualized as a sub-fingerprint (e.g., a partial fingerprint) of the audio data 300, and the database(s) 115 may correlate the fingerprint 560 with the audio data 300 (e.g., store the fingerprint 560 with a reference to an identifier of the audio data 300). FIG. 5 depicts the ordered set 420 being associated with (e.g., correlated with) a timestamp 550 (e.g., timecode) for the segment 310. As noted above, the timestamp 550 may be relative to the audio data 300. Accordingly, the audio processing machine 110 may store (e.g., within the database(s) 115) the ordered set 420 of numbers with the timestamp 550 as the fingerprint 560 of the segment 310. The fingerprint 560 may thus function as a lightweight representation of the segment 310, and such a lightweight representation may be suitable (e.g., in real-time applications) for comparing with similarly generated fingerprints of segments of other audio data (e.g., in determining a likelihood that the audio data 300 matches other audio data). In some example embodiments, the ordered set 420 of numbers is rearranged (e.g., concatenated) into a smaller set of ordered numbers (e.g., from 60 8-bit numbers to 20 24-bit numbers or 15 32-bit numbers), and this smaller set of ordered numbers may be stored as the fingerprint 560 of the segment 310.

Figure 6:
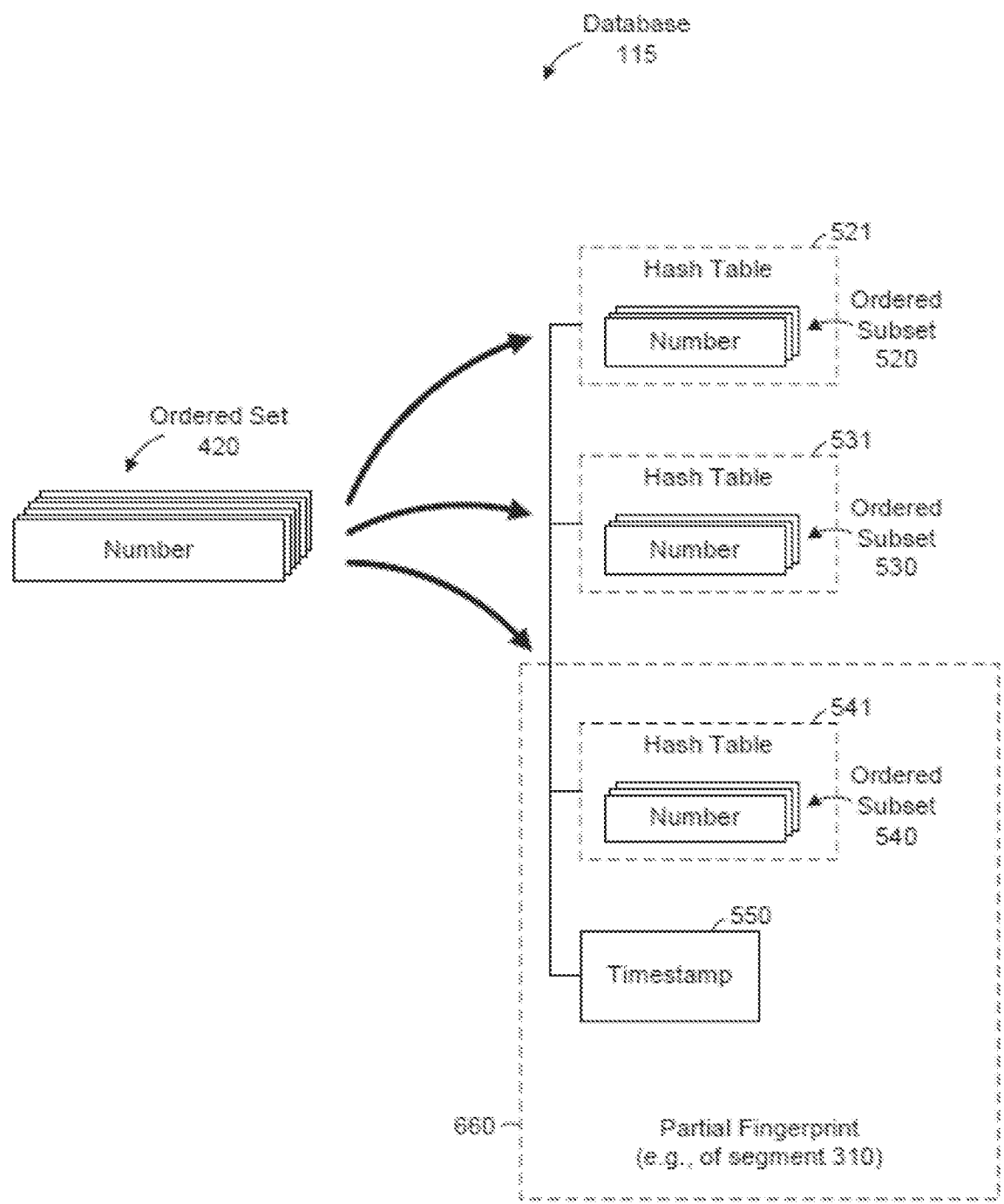

As shown in FIG. 6, some example embodiments of the audio processing machine 110 subdivide the ordered set 420 of numbers (e.g., 60 8-bit numbers) into multiple ordered subsets 520, 530, and 540. Although only three ordered subsets 520, 530, 540 are shown, various example embodiments may utilize other quantities of ordered subsets (e.g., 20 24-bit numbers or 15 32-bit numbers). These ordered subsets 520, 530, and 540 may be stored in the database(s) 115 within their respective hash tables 521, 531, and 541, all of which may be associated with (e.g., assigned to, correlated with, or mapped to) the timestamp 550 for the segment 310. In such example embodiments, a single hash table (e.g., hash table 541 that stores the ordered subset 540) and the timestamp 550 may be stored as a partial fingerprint 660 of the segment 310. The partial fingerprint 660 may therefore function as an even more lightweight representation (e.g., compared to the fingerprint 560) of the segment 310. Such a very lightweight representation may be especially suitable (e.g., in real-time applications) for comparing with similarly generated partial fingerprints of segments of an audio data (e.g., in determining a likelihood that the audio data 300 matches other audio data). The database(s) 115 may correlate the partial fingerprint 660 with the audio data 300 (e.g., store the partial fingerprint 660 with a reference to an identifier of the audio data 300).

As previously discussed, the audio processing machine 110 may be configured to compare fingerprints of audio files to determine how similar the audio files are with respect to one another, such as which audio files are duplicates. In some example embodiments, for a number N of audio files to be considered, the audio processing machine 110 sets one of the audio files as the query audio file and compares it with the rest of the N−1 audio files, which are set as the reference audio files. The fingerprints of the audio files are used for the basis of comparison. Such comparison may be performed with each audio file having a turn being the query audio file, so that an N×N comparison of the audio files is performed.

In some example embodiments, nano-fingerprints of the audio files are used, with a nano-fingerprint comprising a stream of 8-bit sub-fingerprints of an audio file (although, other sizes are within the scope of the present disclosure). The reference and query fingerprint comparison may be performed with blocks of sub-fingerprints to see if the resulting bit-error or bit difference is under a specified threshold. In some example embodiments, a block comprises 32 sub-fingerprints (e.g., a 256-bit block). A query nano-fingerprint may be created by downsampling the reference fingerprint by ¼ in the frequency axis and ¼ in the time axis (e.g., 2 blocks=3 seconds), and a reference nano-fingerprint may be created by downsampling ¼ in frequency and ⅛ in time (e.g., 1 block=3 seconds). In some example embodiments, with a full fingerprint, 3 second comprises 1 block (i.e., a full fingerprint block is 32 bit×256~1 kByte). A nano-fingerprint, downsampled from 4 bytes to 1 byte over frequency, may be 256 bytes, 64 bytes (downsampled by ¼ over time), or 32 bytes (downsampled by ⅛ over time). In some example embodiments, the concept of blocks is only applied to query fingerprints, not reference fingerprints, in the interest of achieving a fixed block size for decision criteria to determine a match. In computing a match, a determination may be made as to whether a particular bit error rate threshold is met. This threshold may be dependent on the number of bits that are compared, and, indirectly, on the time duration the query fingerprint represents (e.g., a comparison of a block size of 6 seconds and twice as many bits would then have to meet a different (e.g., higher) bit error threshold). In other example embodiments, such as those employing different fingerprint technologies, these constraints may work differently, or different constraints may apply. For example, the audio processing machine 110 may use a continuous function that would adjust the threshold dependent on the dynamic length of the query fingerprint, so it could query 64 bytes, 72 bytes, or any other number of bytes, and have to meet a different threshold for each case.

In some example embodiments, the audio processing machine 110 (e.g., the search module 212) generates a reference grid from the reference fingerprints and a query grid from the query fingerprints. The reference grid and query grid may be used by the audio processing machine 110 to efficiently compare query fingerprints with reference fingerprints in forming the set of candidate audio files 215. In some example embodiments, the reference grid is formed from w blocks of a fingerprint 211 which are offset by 1 sub-fingerprint from one another, while the query grid is formed from 2*w blocks of a fingerprint 211. In some example embodiments, the audio processing machine 110 is configured to downsample a reference fingerprint to a more compact representation, as the audio processing machine 110 attempts to store as many reference fingerprints in memory as possible. So, for example, the audio processing machine 110 may use a downsampling factor of ⅛ for reference fingerprints, resulting in 32 bytes/3 seconds of audio, while using a downsampling factor of ¼ for query fingerprints, resulting in 64 bytes/3 seconds of audio. The audio processing machine 110 may then perform two comparisons for each query fingerprint to the same segment of 32 bytes of reference fingerprint (byte 1, 2, 3, 4, etc.), with the first query fingerprint being bytes 1, 3, 5, 7, etc. and the second query fingerprint being bytes 2, 4, 6, 8, etc., and then slide by 1 byte in the reference fingerprint and repeat the process, in effect sliding the query fingerprint across the reference fingerprint.

Figure 7:
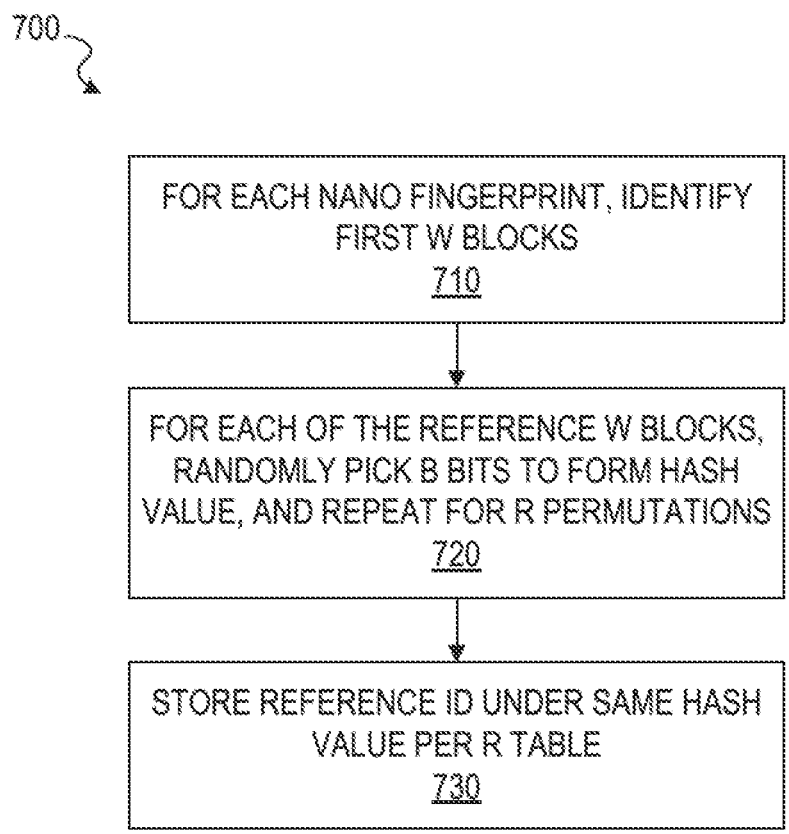
FIG. 7 is a flowchart illustrating a method of building an index, in accordance with some example embodiments.

In some example embodiments, the audio processing machine 110 (e.g., the search module 212) is configured to build an index. FIG. 7 is a flowchart illustrating a method 700 of building an index, in accordance with some example embodiments, and FIG. 8 is a conceptual diagram illustrating the building of the index.

Referring to FIG. 7, method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the audio processing machine 110 of FIG. 1-2, or any combination of one or more of its components or modules (e.g., search module 212). At operation 710, for each reference nano-fingerprint, the first w blocks are identified. In some example embodiments, w is the width of the reference grid. At operation 720, for each of those w reference blocks, b bits are randomly selected from the block to form a hash value, and the random selection is repeated for r permutations. At operation 730, the reference identification (ID) corresponding to the audio file to which the reference nano-fingerprint belongs is stored under the formed hash value for the r permutation table. For example, in FIG. 8, the reference IDs are stored in the corresponding BUCKET[HASH][R] to form the index 800. It is contemplated that any of the other features described within the present disclosure can be incorporated into method 700.

Figure 8:
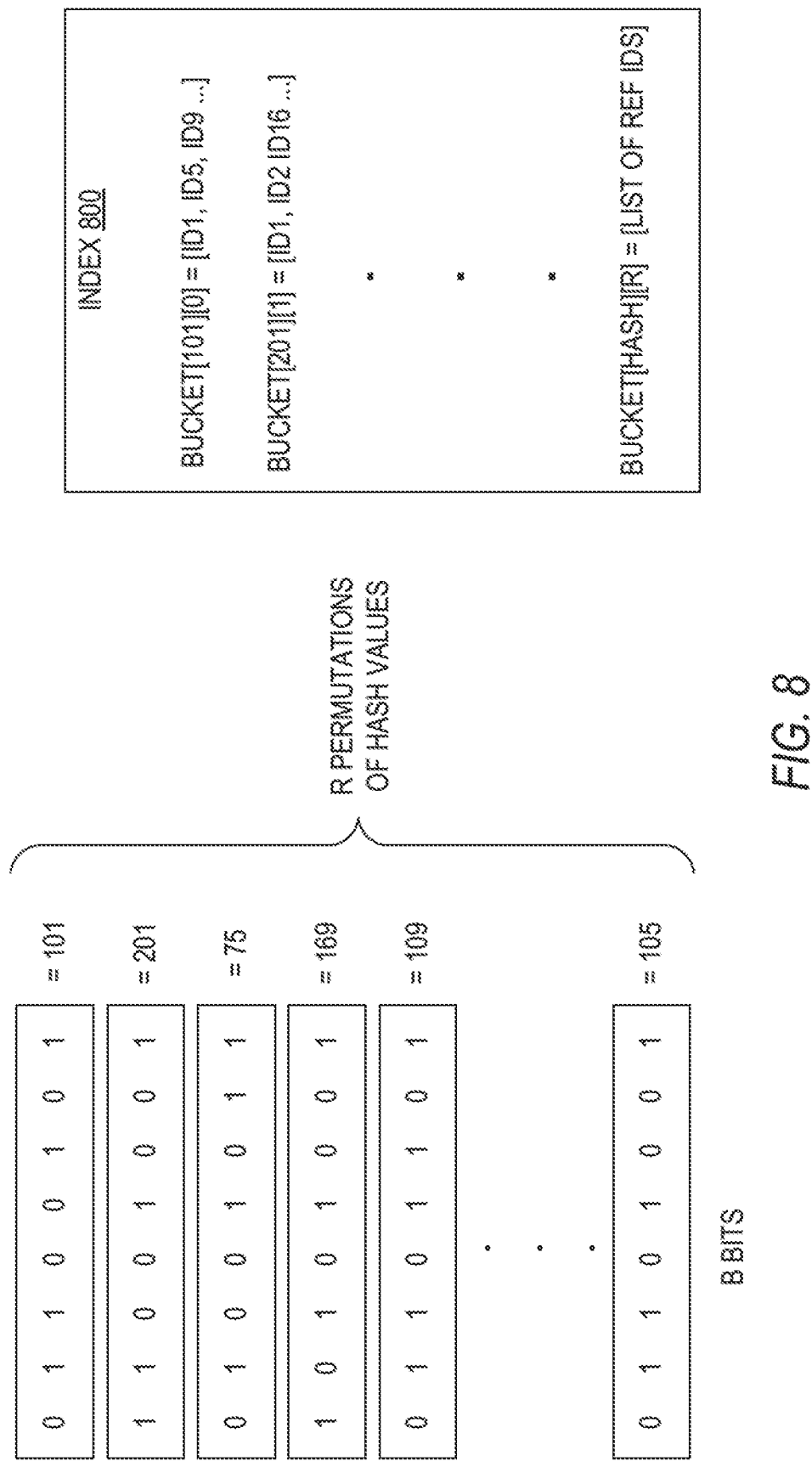
FIG. 8 is a conceptual diagram illustrating the building of an index.
Figure 9:
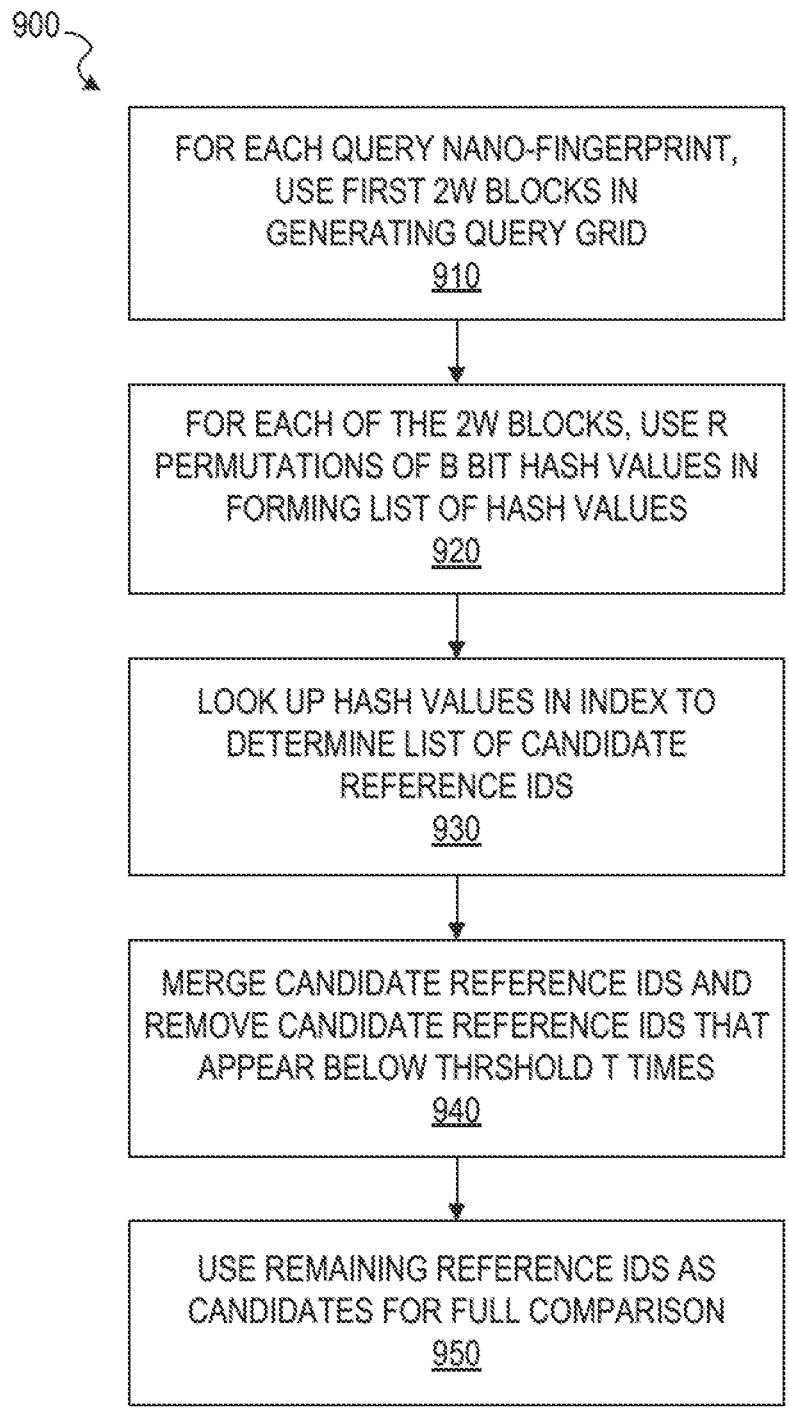
FIG. 9 is a flowchart illustrating a method of determining candidates for full fingerprint comparison, in accordance with some example embodiments.

In some example embodiments, the audio processing machine 110 (e.g., the search module 212) is configured to determine candidates for full fingerprint comparison (e.g., candidate set 215 in FIG. 2) using the index built using the techniques disclosed herein (e.g., using index 800 of FIG. 8). FIG. 9 is a flowchart illustrating a method 900 of determining candidates for full fingerprint comparison, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the audio processing machine 110 of FIG. 1-2, or any combination of one or more of its components or modules (e.g., search module 212).

At operation 910, for each query nano-fingerprint, the first 2*w blocks of the query nano-fingerprint are used to generate a query grid. At operation 920, for each of those 2*w blocks, r permutations of b bit hash values are used forming a list of hash values from the query grid. At operation 930, the hash values are looked up in the index (e.g., index 800 of FIG. 8) to determine a list of candidate reference IDs. At operation 940, all of the determined candidate reference IDs are merged, and it is determined which candidate reference IDs appear less than a threshold T times. Those candidate reference IDs that have been determined to appear less than the threshold T times are then removed from the list of candidate reference IDs. At operation 950, the remaining candidate reference IDs in the list are then used as the set of candidates for full fingerprint comparison. It is contemplated that any of the other features described within the present disclosure can be incorporated into method 900.

It is contemplated that the audio processing machine 110 may employ a variety of different methods for indexing and searching for candidates. One method comprises text matching, such as finding audio tracks that have the same or sufficiently similar artist name and track title. Another method comprises using a certain type of fingerprint, which involves computing a 60 byte key from the first 15 seconds of audio. Yet another method comprises using a locally sensitive hashing (LSH) based indexing scheme that selects a scattered set of bits over frequency and time, and generates a hash table from that scattered set of bits.

Figure 10:
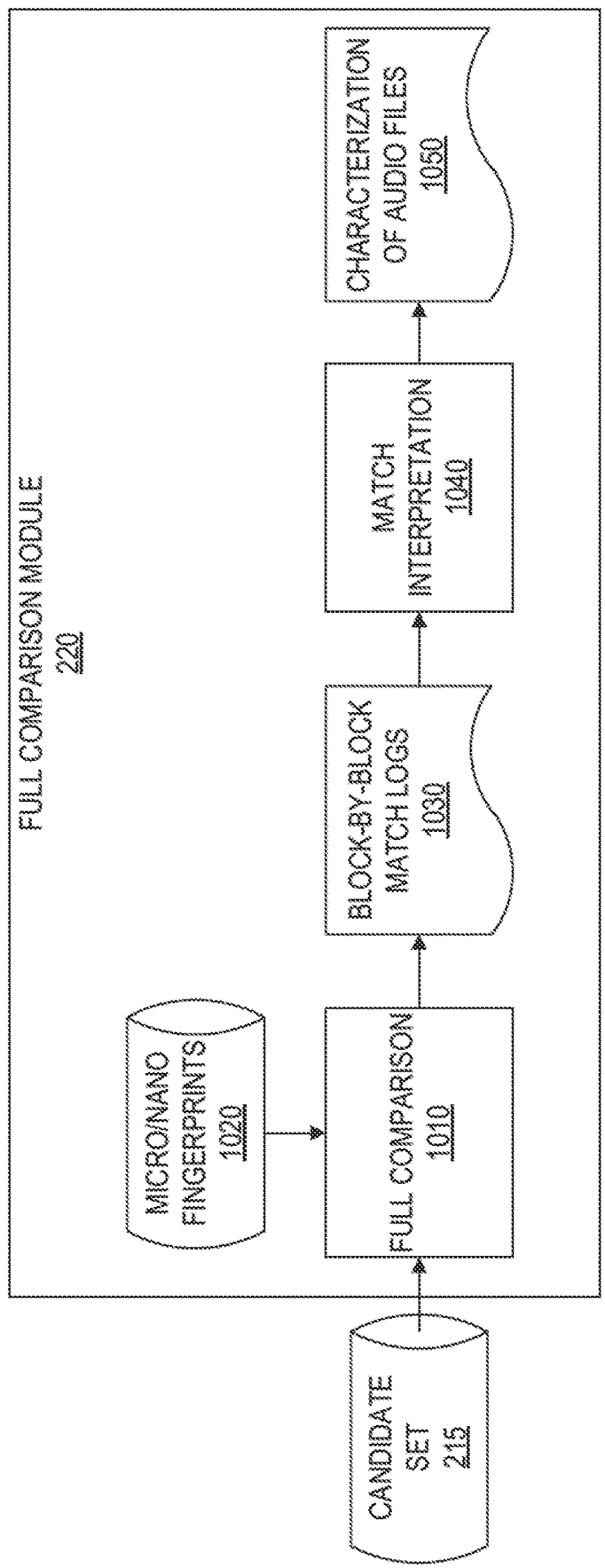
FIG. 10 is a system diagram illustrating components of full fingerprint comparison, in accordance with some example embodiments.

FIG. 10 is a system diagram illustrating components of full fingerprint comparison, in accordance with some example embodiments. In FIG. 10, the set of candidate audio files 215 (e.g., the reference IDs of the candidate audio files) is input into a full comparison module 1010. In some example embodiments, the full comparison module 1010 is configured to retrieve fingerprints, such as nano-fingerprints or micro-fingerprints, of the audio files corresponding to the reference IDs of the candidate audio files 215, and to perform an N×N comparison of the full audio files (e.g., the full songs), where the entirety of a query audio file is compared with the entirety of each reference audio file.

In some example embodiments, the full comparison module 1010 generates a block-by-block match log 1030 based on the comparison. For example, the full comparison module 1010 may create a map of how closely a query audio file matches a reference audio file over playback time. In some example embodiments, for nano-fingerprint comparisons, a block size of 3 seconds is used. In some example embodiments, any leading or trailing silence is stripped out, and silence within a recording is represented by a magic number, not a pseudo random sequence. In some example embodiments, not only are the leading and trailing silence stripped out, but a first and last non-silent portion of the audio (e.g., the first and last 3 seconds) are also ignored, as some songs fade in and out a bit faster than others, even though they may essentially be the same recording (e.g., the same song). This is often the case between a song that is in the original album and the same song that is in a compilation album. In some example embodiments, using a random sequence is useful if the audio processing machine 110 is only matching a single block, as it is undesirable to have a silent part of the song match all songs that have a silent part anywhere in the song. In some example embodiments, using a magic number allows the audio processing machine 110 to not index all silent parts of a song (or other type of audio). The use of a magic number may be helpful in validating a song, as query fingerprints and reference fingerprints should have silence or breaks in the same temporal position(s) in the song. The block slip factor indicates that block n+1 does not match seamlessly after block n in the reference audio, but either one or more bytes before or after the end of the best match position of block n, which indicates that the query audio was a little bit slower or faster than the reference audio, which often occurs for older originally-analog recordings that have been digitized several times using different analog tape machines running at slightly different speeds. The audio processing machine 110 may identify these as the same original recording, but also identify them as slightly different versions because of the speed change.

In some example embodiments, the block-by-block match log is stored as a block match table of a pairwise comparison, and equivalent memory footprint would correspond to five 32-bit numbers per 3 s of query comparison. The numbers may represent a matched block number, the equivalent time offset into the reference, the bit error rate (BER) at the match location, and the block slip factor between the query audio file and the reference audio file. The offset into the query may be implied by linearly processing the query fingerprint.

In some example embodiments, the relevant statistics are parsed out from the block match table, such as duration ratio between query audio file and reference audio file, average BER, min and max BER, the standard deviation (STD) of the BER, the longest string of matching blocks with match positions, the longest string of non-matching blocks with positions, the average slip factor, and the STD of the slip factor. Additionally, any time discontinuities in the match table may be called out (e.g., matches either repeat a section, or go to an earlier or later section as compared to the reference time line).

In some example embodiments, the full comparison module 220 comprises a match interpretation module 1040 configured to interpret the results of the full comparison module 1010 (e.g., the block-by-block match logs 1030) using a set of interpretation rules. The match interpretation module 1040 may use the interpretation rules to properly categorize the relationship between the query audio file and the reference audio file.

FIG. 11 illustrates a table 1100 of interpretation rules, in accordance with some example embodiments. As seen in FIG. 11, the interpretation rules may provide corresponding interpretations and additional processing operations for certain results of the full comparison module 1010. In some example embodiments, the additional processing operations may include a closer analysis of recordings that match very closely, to identify subtle differences such as explicit/non-explicit versions, additional instruments or subtle changes in lyrics or in the mix (e.g., remasters), and coding artifacts, among other things. This closer analysis can be achieved either using a full fingerprint or a smaller fingerprint (e.g., a nano-fingerprint or a micro-fingerprint). In some example embodiments, the BER is analyzed on the sub-fingerprint level, and spikes therein, for example, are interpreted as indicating issues regarding explicit versus non-explicit lyrics or similar mix changes.

In some example embodiments, micro-fingerprints are only downsampled b a factor of ½ across frequency, and ½ over time for query fingerprints or ¼ over time for reference fingerprints. For more in-depth analysis, the audio processing machine 110 may use a fingerprint with more information, such as either the original 23 bit-wide fingerprint stream, with a new sub-fingerprint every 11.7 ms, or the micro-fingerprint. In one example embodiment, the audio processing machine 110 determines clusters of recordings that are essentially identical from the N×N match using a fairly loose matching criteria to allow for different fade-in/out times, quantization artifacts, such as audio encoding, explicit versus edited versions, different speeds, and other factors. Once the audio processing machine 110 has determined clusters for each recording of related recordings, it may apply more granular comparisons to identify the different variations, such as by creating sub-clusters of specific versions. Within each sub-cluster, the audio processing machine 110 may look for characteristic deviations from other clusters (e.g., very local, short spikes in the bit error rate indicate explicit version versus radio edit version) and tag audio based on these observations. The audio processing machine 110 may additionally or alternatively look for editorial tags (e.g., tags labeling the audio as a clean version or as an explicit version). The audio processing machine 110 may additionally or alternatively look at other data associated with the audio (e.g., an album marked as a compilation versus an album being marked as an original canonized album). In some example embodiments, the audio processing machine 110 pulls in an additional feature indicating the stereo-ness of a signal (e.g., computed from correlation of the left and right channel of the original stereo recording), which the audio processing machine 110 may then use within a cluster to discriminate stereo versus mono audio recordings.

Referring back to FIG. 11, in some example embodiments, the interpretation rules are configured to result in interpretation that the query audio file and the reference audio file are closely related based on the results of the full comparison module 1010 indicating a low average BER and STD BER, and a duration ratio between the query audio file and the reference audio file indicates that they are the same length or almost the same length (e.g., +/−10%). Such an interpretation may have one or more corresponding additional processing operations that are performed by the audio processing machine 110 in response to the interpretation. For example, additional fingerprint comparison and/or a text search of the metadata for certain terms (e.g., 'remastered,' 'explicit') may be performed.

In some example embodiments, the interpretation rules are configured to result in interpretation that the query audio file and the reference audio file are faster or slower versions of the same recording based on the results of the full comparison module 1010 indicating a slippage in match position over time. Such an interpretation may have one or more corresponding additional processing operations that are performed by the audio processing machine 110 in response to the interpretation.

In some example embodiments, the interpretation rules are configured to result in interpretation that there are noticeable distortions between the query audio file and the reference audio file, such as codec artifacts or watermarks, based on the results of the full comparison module 1010 indicating that the overall BER is fairly high. Such an interpretation may have one or more corresponding additional processing operations that are performed by the audio processing machine 110 in response to the interpretation. For example, the source of the query audio file and the source of the reference audio file may be identified.

In some example embodiments, the interpretation rules are configured to result in interpretation that the query audio file and the reference audio file are alternate versions with different instruments and/or vocals based on the results of the full comparison module 1010 indicating that there are long sequences of close matches, interspersed with longer sections of high BER. Such an interpretation may have one or more corresponding additional processing operations that are performed by the audio processing machine 110 in response to the interpretation. For example, a text search of the metadata for certain terms may be performed.

It is contemplated that other configurations of interpretation rules and additional processing operations corresponding to results of the full comparison module 1010 are also within the scope of the present disclosure.

Referring back to FIG. 10, in some example embodiments, the match interpretation module 1040 is configured to generate a characterization of the audio files 1050 based on its interpretation of the results of the full comparison module 1010. This characterization may include the identification and labeling of clusters of perceptually unique recordings, thereby detailing the relationships between the audio files that were determined by the match interpretation module. In some example embodiments, the audio processing machine 110 stores these characterizations in the database(s) in association with their corresponding audio files or with the reference IDs of their corresponding audio files. As a result, the audio processing machine 110 may use these characterizations in making recommendations to users and in statistics provided to user (e.g., popularity statistics).

Figure 12:
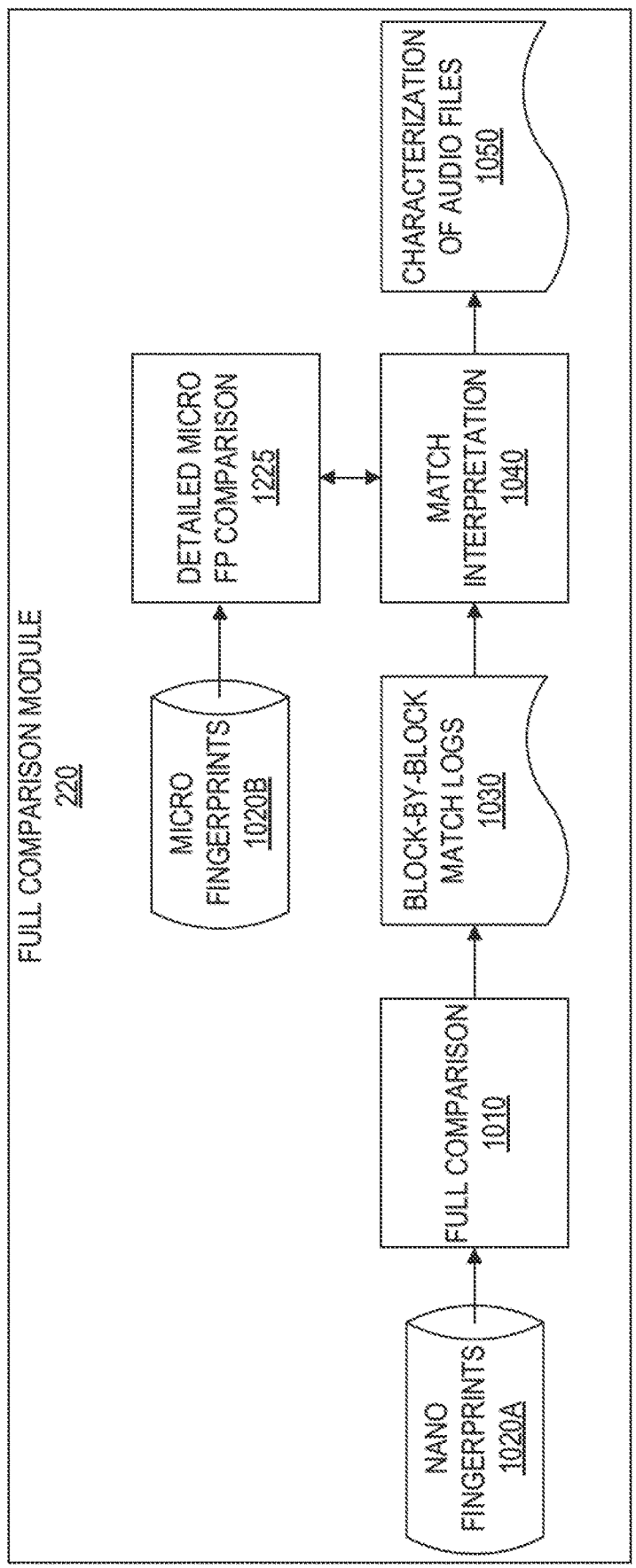
FIG. 12 is a diagram illustrating components of full fingerprint comparison, in accordance with some example embodiments.

FIG. 12 is a diagram illustrating components of full fingerprint comparison, in accordance with some example embodiments. In FIG. 12, nano-fingerprints 1020A of the candidate audio files are inputted into the full comparison module 1010, which performs an N×N comparison of the full audio files (e.g., the full songs) using the nano-fingerprints. In some example embodiments, the full comparison module 1010 generates a block-by-block match log 1030 based on the comparison, which is then interpreted by the match interpretation module 1040 using a set of interpretation rules. In some example embodiments, the match interpretation module 1040 also interprets results from a detailed micro-fingerprint comparison 1225 of micro-fingerprints 1020B of the candidate audio files. The interpretation of these results may be used to supplement the interpretation of the full comparison module 1010 in generating the characterization of audio files 1050.

Figure 13:
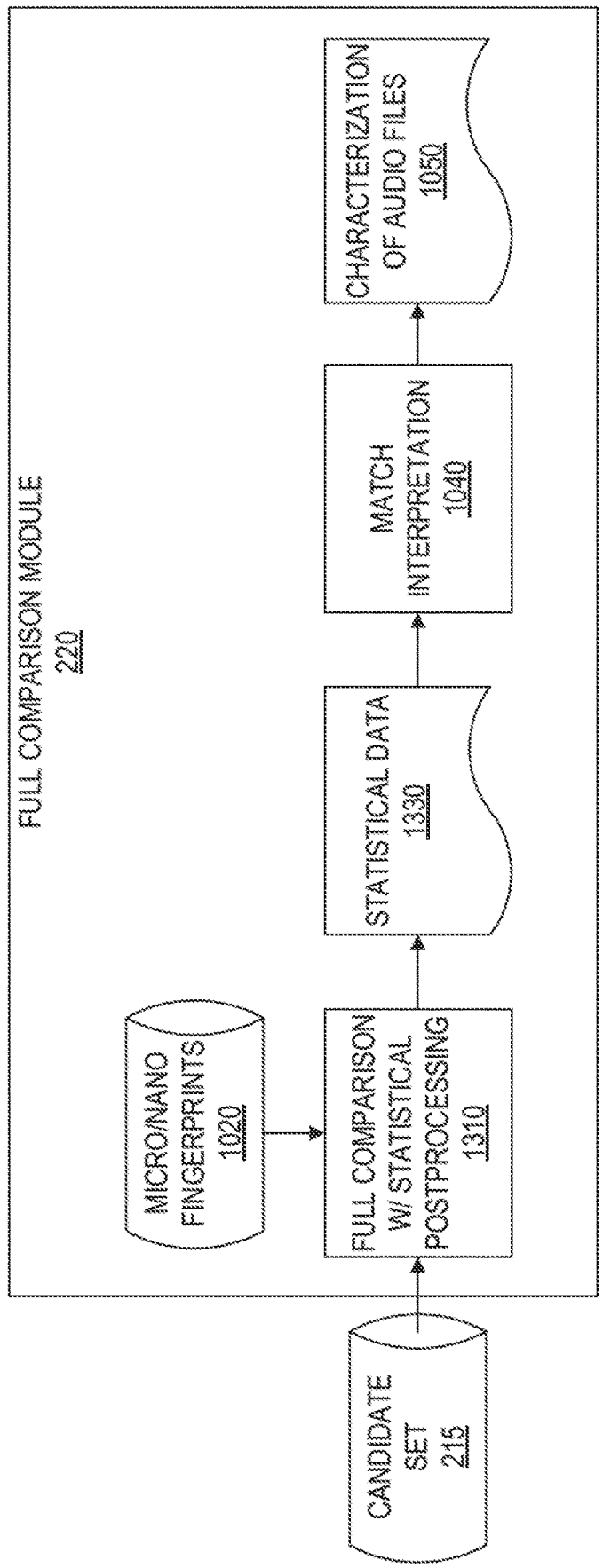
FIG. 13 is a diagram illustrating components of full fingerprint comparison, in accordance with some example embodiments.

FIG. 13 is a diagram illustrating components of full fingerprint comparison, in accordance with some example embodiments, where a full comparison of micro- and/or nano-fingerprints 1020 corresponding to the candidate audio files 215 is performed by full comparison module 1310, including statistical post-processing operations generating statistical data 1330 (e.g., BER, slip, etc.). The statistical data 1330 may then be used by the match interpretation module 1040 to generate characterizations of the audio files 1050, as previously discussed.

Figure 14:
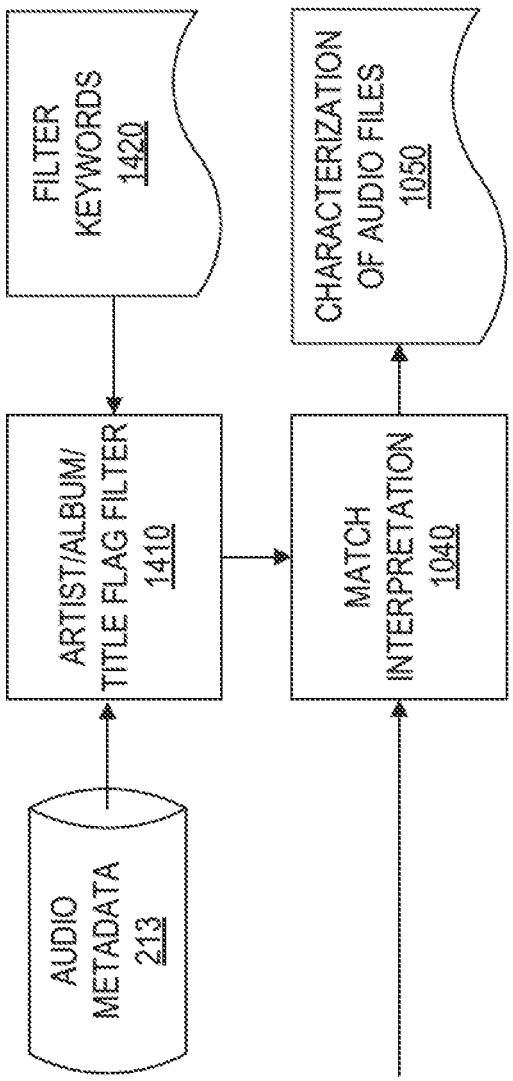
FIG. 14 is a diagram illustrating components of full fingerprint comparison, in accordance with some example embodiments.

While fingerprint matching can generally identify relationships between the same recordings, it will often categorize an acoustic version of a song as a different recording than the original studio version of the same song. In some example embodiments, the audio processing machine searches for clues in the metadata of the song as to which fingerprint cluster representing different recordings of a song is an acoustic or live version versus an electric studio recording. FIG. 14 is a diagram illustrating components of full fingerprint comparison, in accordance with some example embodiments. In FIG. 14, audio metadata 213 (e.g., music text metadata) of the candidate audio files and filter keywords 1420 are used by a filter 1410 to find clues as to which fingerprint cluster representing different recordings of a song is an acoustic or live version versus an electric studio recording. The filter 1410 may search the artist, album, and title metadata for the filter keywords 1420, and provide the results of the search to the match interpretation module 1040 for use in generating the characterization of the audio files 1050.

Figure 15A:
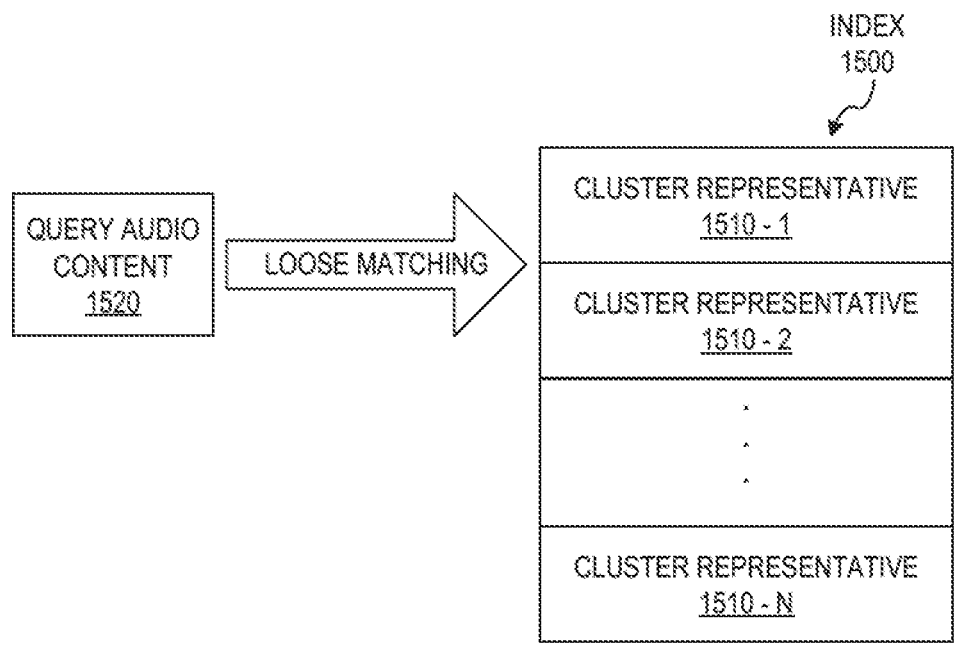
FIGS. 15A and 15B illustrate an index of audio recording clusters being used for comparison with query audio content, in accordance with some example embodiments.
Figure 15B:
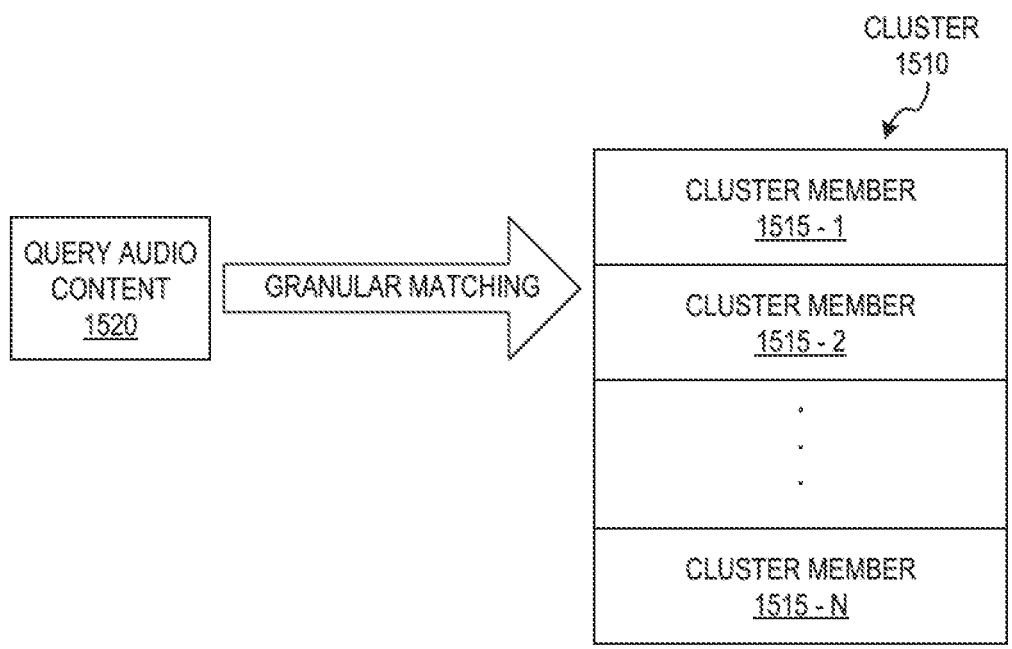

As previously discussed, in some example embodiments, the audio processing machine 110 determines clusters of recordings, with each member of a particular cluster being matched with the other members of the cluster based on a fairly loose matching criteria to allow for factors such as different fade-in/out times, quantization artifacts (e.g., audio encoding), explicit versus edited versions, different speeds, and other factors. FIGS. 15A and 15B illustrate an index 1500 of audio recording clusters 1510 being used for comparison with query audio content, in accordance with some example embodiments. In some example embodiments, in building the index 1500 in FIG. 15A, the audio processing machine 110 loads only one representative for each cluster into the index 1500 in order to keep the index 1500 compact. For example, in FIG. 15A, cluster representative 1510-1 is loaded into the index 1500 as the representative of one cluster, cluster representative 1510-2 is loaded into the index 1500 as the representative of another cluster, and so on and so forth for N number of clusters to be represented in the index 1500.

In some example embodiments, when processing query audio content 1520, the audio processing machine 110 uses loose matching criteria in comparing the query audio content 1520 to the cluster representatives 1510 to find a loose match of which cluster the query audio content 1520 belongs to. In some example embodiments, this loose matching operation uses nano-fingerprints of the audio content being compared as the basis for comparison.

In some example embodiments, once the audio processing machine 110 has identified which cluster the query audio content 1520 belongs to, the audio processing machine 110 compares the query audio content 1520 against all of the cluster members 1515 of the identified cluster. For example, in FIG. 15B, the identified cluster 1510 comprises cluster member 1515-1, cluster member 1515-2, . . . , cluster member 1515-N, and the audio processing machine compares the query audio content 1520 with cluster member 1515-1, cluster member 1515-2, . . . , cluster member 1515-N using more granular matching criteria. In some example embodiments, this granular matching operation uses micro-fingerprints or full fingerprints of the audio content being compared as the basis for comparison. In some example embodiments, in addition or as an alternative to fingerprint comparison, the audio processing machine 110 employs a feature comparison method, where audio characteristics of the audio contents, such as chords, rhythmic features, instrument onsets, and the like, are compared. In some example embodiments, the audio processing machine 110 uses a method that does not perform block-wise comparison, but rather looks only at very small or short regions of the fingerprint (e.g., only a few sub-fingerprints, or equivalent to, for example, 50-100 ms audio duration) to identify very short deviations from one audio content to another (e.g., explicit version of song versus radio edit version of the same song).

Example Mobile Device

Figure 16:
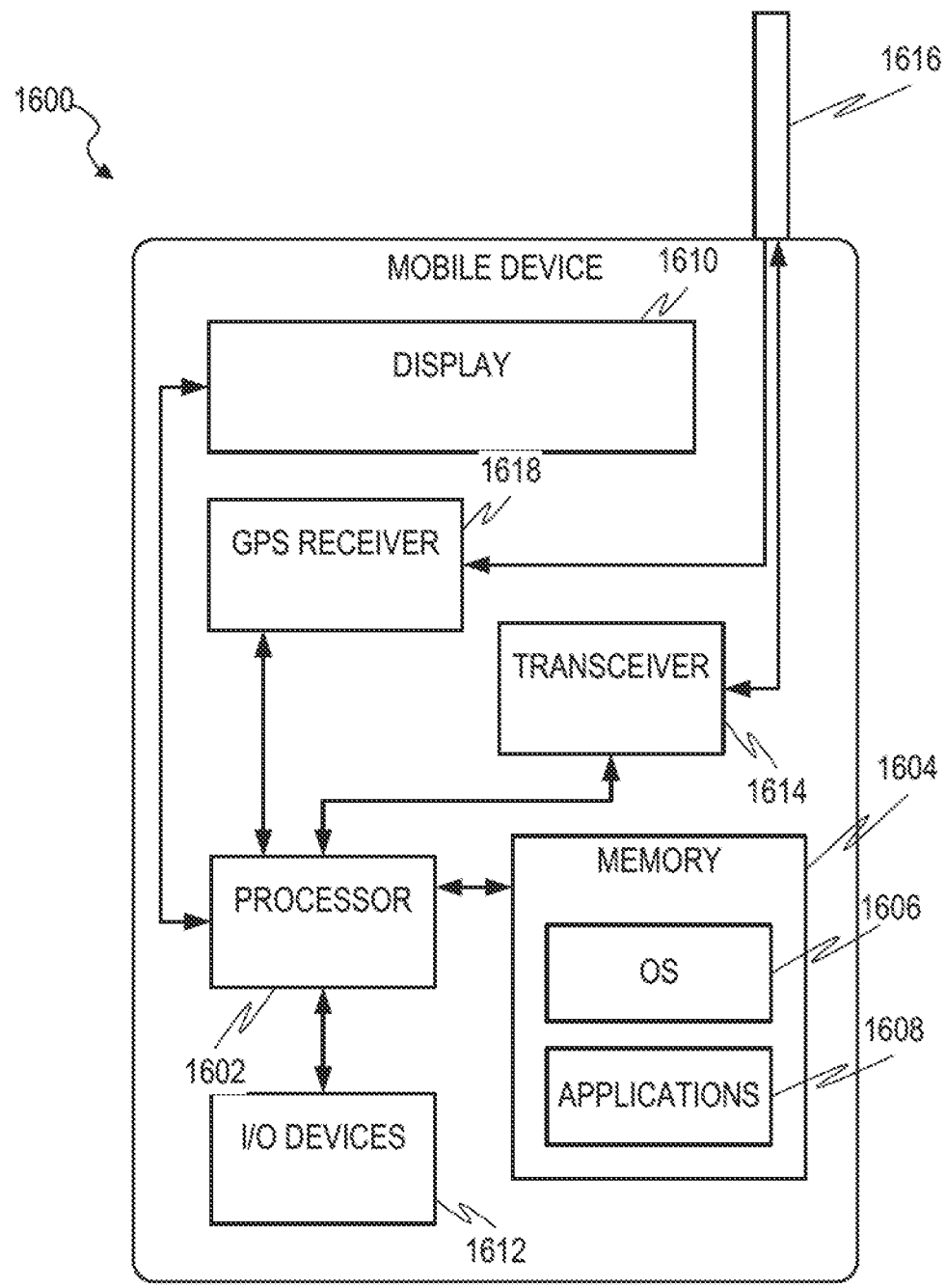
FIG. 16 is a block diagram illustrating a mobile device, in accordance with some example embodiments.

FIG. 16 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location enabled application that can provide LBSs to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field-programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 17:
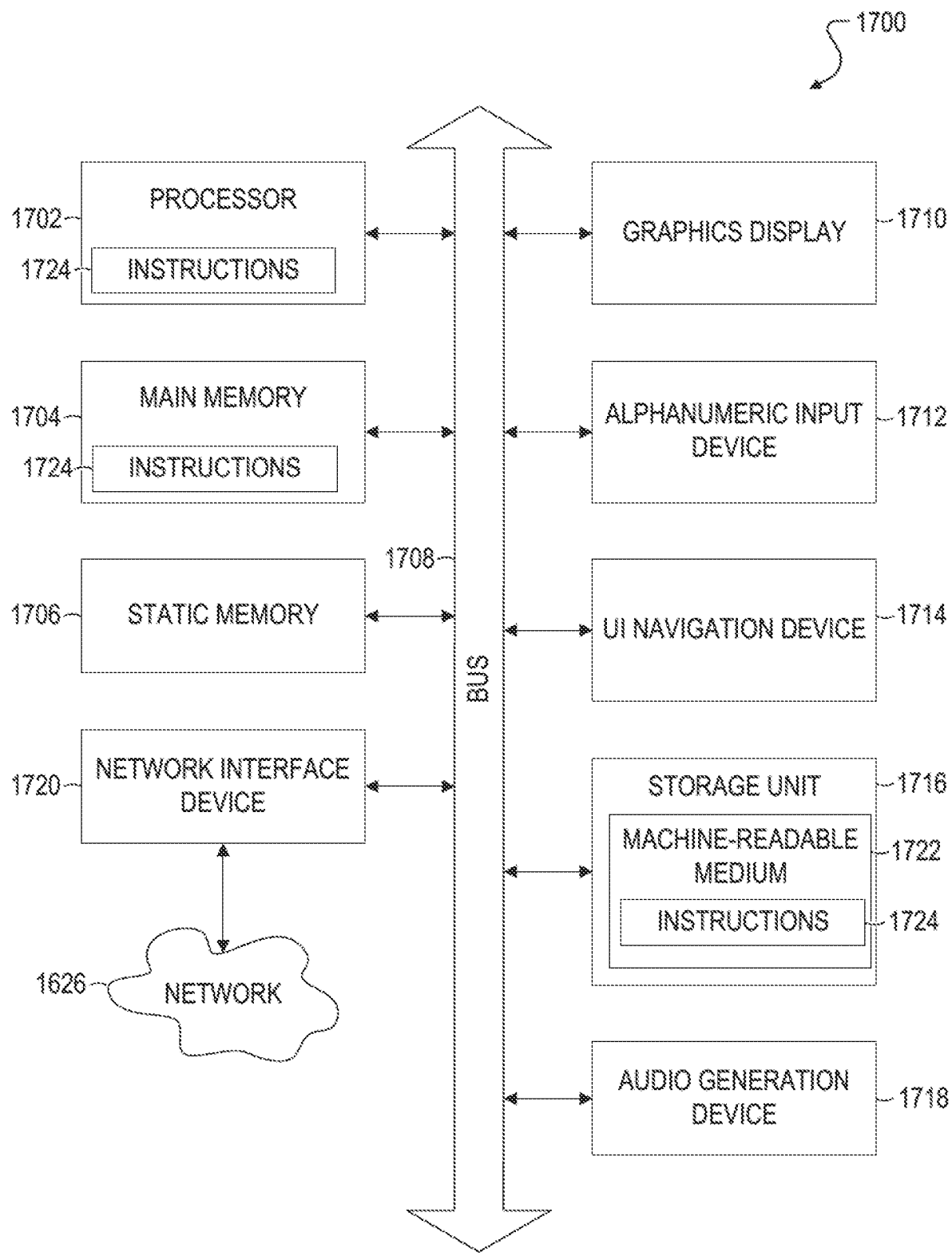
FIG. 17 is a block diagram of an example computer system on which methodologies described herein can be executed, in accordance with some example embodiments.

FIG. 17 is a block diagram of a machine in the example form of a computer system 1700 within which instructions 1724 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 can further include a video display unit 1710 (e.g., a liquid crystal display (LCD) or a cathode ray tube (CRT)). The computer system 1700 also includes an alphanumeric input device 1712 (e.g., a keyboard), a user interface (UI) navigation (or cursor control) device 1714 (e.g., a mouse), a disk drive unit 1716, a signal generation device 1718 (e.g., a speaker) and a network interface device 1720.

The disk drive unit 1716 includes a machine-readable medium 1722 on which is stored one or more sets of data structures and instructions 1724 (e.g., software) embodying or utilized by any one or more of the methodologies or functions described herein. The instructions 1724 can also reside, completely or at least partially, within the main memory 1704 and/or within the processor 1702 during execution thereof by the computer system 1700, the main memory 1704 and the processor 1702 also constituting machine-readable media. The instructions 1724 can also reside, completely or at least partially, within the static memory 1706.

While the machine-readable medium 1722 is shown in an example embodiment to be a single medium, the term "machine-readable medium" can include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1724 can further be transmitted or received over a communications network 1726 using a transmission medium. The instructions 1724 can be transmitted using the network interface device 1720 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A tangible, non-transitory computer-readable storage medium, comprising instructions that, when executed, cause one or more processors to perform a set of operations comprising:
   generating an index comprising a plurality of representative audio content, wherein each representative audio content of the plurality of representative audio content is stored in association with a hash value, and wherein the hash value is associated with a candidate reference identifier;
   removing candidate reference identifiers that appear less than a threshold number of times;
   in response to removing the candidate reference identifiers that appear less than a threshold number of times, generating a first comparison of query audio content to each representative audio content associated with a remaining set of candidate reference identifiers, wherein the remaining set of candidate reference identifiers does not include the removed candidate reference identifiers, and wherein the first comparison is generated using a first matching criteria; and matching the query audio content to at least one representative audio content of the plurality of representative audio content based on the generated first comparison.

2. The tangible, non-transitory computer-readable storage medium of claim 1, wherein the first comparison comprises a comparison of at least one of: (i) a content duration ratio; (ii) a bit error rate at a matching location; and (iii) or a length of matching positions.

3. The tangible, non-transitory computer-readable storage medium of claim 1, wherein the hash value is based on permutations of a binary vector formed using a spectral representation of the representative audio content.

4. The tangible, non-transitory computer-readable storage medium of claim 1, wherein matching the query audio content to at least one representative audio content comprises comparing fingerprint data of the query audio content with fingerprint data of each representative audio content in the index using the first matching criteria.

5. The tangible, non-transitory computer-readable storage medium of claim 1, wherein each representative audio content of the plurality of representative audio content comprises a song.

6. The tangible, non-transitory computer-readable storage medium of claim 1, wherein each representative audio content comprises representative audio content for a cluster.

7. The tangible, non-transitory computer-readable storage medium of claim 6, wherein the cluster comprises at least two audio contents.

8. The tangible, non-transitory computer-readable storage medium of claim 7, wherein the set of operations further comprises determining a corresponding cluster of the matched at least one representative audio content.

9. The tangible, non-transitory computer-readable storage medium of claim 8, wherein the set of operation further comprises generating a second comparison of the query audio content to the least two audio contents of a corresponding cluster of the matched at least one representative audio content using a second matching criteria.

10. The tangible, non-transitory computer-readable storage medium of claim 9, wherein the second matching criteria is different from the first matching criteria.

11. A computer-implemented method comprising:
generating an index comprising a plurality of representative audio content, wherein each representative audio content of the plurality of representative audio content is stored in association with a hash value, and wherein the hash value is associated with a candidate reference identifier;
removing candidate reference identifiers that appear less than a threshold number of times;
in response to removing the candidate reference identifiers that appear less than a threshold number of times, generating a first comparison of query audio content to each representative audio content associated with a remaining set of candidate reference identifiers, wherein the remaining set of candidate reference identifiers does not include the removed candidate reference identifiers, and wherein the first comparison is generated using a first matching criteria; and matching the query audio content to at least one representative audio content of the plurality of representative audio content based on the generated first comparison.

12. The computer-implemented method of claim 11, wherein the first comparison comprises a comparison of at least one of: (i) a content duration ratio; (ii) a bit error rate at a matching location; and (iii) or a length of matching positions.

13. The computer-implemented method of claim 11, wherein the hash value is based on permutations of a binary vector formed using a spectral representation of the representative audio content.

14. The computer-implemented method of claim 11, wherein matching the query audio content to at least one representative audio content comprises comparing fingerprint data of the query audio content with fingerprint data of each representative audio content in the index using the first matching criteria.

15. The computer-implemented method of claim 11, wherein each representative audio content of the plurality of representative audio content comprises a song.

16. The computer-implemented method of claim 11, wherein each representative audio content comprises representative audio content for a cluster.

17. The computer-implemented method of claim 16, wherein the cluster comprises at least two audio contents.

18. The computer-implemented method of claim 17, further comprising determining a corresponding cluster of the matched at least one representative audio content.

19. The computer-implemented method of claim 18, further comprising generating a second comparison of the query audio content to the least two audio contents of a corresponding cluster of the matched at least one representative audio content using a second matching criteria, wherein the second matching criteria is different from the first matching criteria.

20. A computing device comprising:
one or more processors; and
a tangible, non-transitory computer-readable storage medium, comprising instructions that, when executed, cause the one or more processors to perform a set of operations comprising:
generating an index comprising a plurality of representative audio content, wherein each representative audio content of the plurality of representative audio content is stored in association with a hash value, and wherein the hash value is associated with a candidate reference identifier;
removing candidate reference identifiers that appear less than a threshold number of times;
in response to removing the candidate reference identifiers that appear less than a threshold number of times, generating a first comparison of query audio content to each representative audio content associated with a remaining set of candidate reference identifiers, wherein the remaining set of candidate reference identifiers does not include the removed candidate reference identifiers, and wherein the first comparison is generated using a first matching criteria; and
matching the query audio content to at least one representative audio content of the plurality of representative audio content based on the generated first comparison.

* * * * *